(12) United States Patent
Suwa

(10) Patent No.: US 12,742,896 B2
(45) Date of Patent: Sep. 22, 2026

(54) RADIATION IMAGE PHOTOGRAPHING APPARATUS

(71) Applicant: CANON KABUSHIKI KAISHA, Tokyo (JP)

(72) Inventor: Hidetomo Suwa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 184 days.

(21) Appl. No.: 18/666,341

(22) Filed: May 16, 2024

(65) Prior Publication Data

US 2024/0385339 A1 Nov. 21, 2024

(30) Foreign Application Priority Data

May 17, 2023 (JP) ................................ 2023-081392

(51) Int. Cl.
*G01T 1/24* (2006.01)

(52) U.S. Cl.
CPC .............. *G01T 1/244* (2013.01); *G01T 1/241* (2013.01)

(58) Field of Classification Search
CPC ................................ G01T 1/244; G01T 1/241
See application file for complete search history.

(56) References Cited

U.S. PATENT DOCUMENTS 10,061,042 B2 * 8/2018 Suzuki .................. G03B 42/04
2003/0031296 A1 * 2/2003 Hoheisel .............. H10F 39/189 378/98.8
2012/0074331 A1 * 3/2012 Koyanagi ................ G01T 1/16 250/394
2012/0195409 A1 * 8/2012 Suwa .................... G03B 42/04 378/189
2014/0254756 A1 * 9/2014 Tagawa ................. H01R 13/62 378/189
2016/0299241 A1 * 10/2016 Suzuki ...................... G01T 7/00
2020/0064501 A1 * 2/2020 Jadrich ................ G01T 1/2002
2020/0408938 A1 * 12/2020 Iwakiri ................ G01T 1/2023
2022/0082714 A1 * 3/2022 Ushikura ............ A61B 6/4208

FOREIGN PATENT DOCUMENTS

JP H06309279 A 11/1994

* cited by examiner

*Primary Examiner* — Hugh Maupin
(74) *Attorney, Agent, or Firm* — Canon U.S.A., Inc. IP Division

(57) ABSTRACT

To provide a radiation image photographing device which can be bent recoverably according to a use purpose. A radiation image photographing device can include a radiation detector having flexibility, a support base for supporting the radiation detector, an exterior including the radiation detector, an internal component for driving the radiation detector, and a holding unit, wherein the holding unit can include a member capable of absorbing the deviation of the relative position caused by the difference between the bending rigidity of the internal component and the bending rigidity of the configuration when the configuration including the radiation detector, the support base, and the exterior is bent.

9 Claims, 11 Drawing Sheets

RADIATION IMAGE PHOTOGRAPHING APPARATUS

BACKGROUND

Field

The present disclosure generally relates to a radiation image photographing apparatus.

Description of the Related Art

Conventionally, a device for irradiating a subject with radiation, detecting the intensity distribution of the radiation transmitted through the subject, and obtaining a radiation image of the subject has been widely used in industrial nondestructive testing and medical diagnosis. Recently, due to advances in digital technology and semiconductor process technology, a method for obtaining a radiation image by applying the technology has become popular. Apparatuses adopting this method incorporate a radiation detection panel equipped with a semiconductor sensor having a desired area. In this method, it is possible to detect the intensity distribution of radiation transmitted through a subject by converting it into an electrical signal by the radiation detection panel, process the obtained electrical signal, and reproduce it as a visible image on a monitor or the like. In addition, the obtained visible image can be subjected to image processing later to change the contrast or the like to obtain a desired image.

Conventional semiconductor sensors mainly use a glass as a base. In recent years, semiconductor sensors use resin films as the base have been developed instead of glass base, and radiation detection panels equipped with these sensors have also started to be supplied to the market. In the case of glass base, there is a risk of breakage due to bending or drop impact, but the risk of breakage is greatly reduced by replacing them with resin films base. In addition, by using resin films as the base, there has been a proposal of a radiation image photographing apparatus that can bend according to the purpose of use, taking advantage of its flexibility.

Japanese Patent Application Laid-Open No. H06-309279 discloses a radiation detection panel having a flexible outer casing. In this radiation detection panel, since the electric substrate is not flexible, the wiring substrate, which is responsible for connections between electric substrates, is made flexible so that the radiation detection panel as a whole can be bent. However, in such a configuration, it is necessary to subdivide the electric substrate into a plurality of small substrates, and there have been problems such as increment of cost.

SUMMARY

One of the purposes of the present disclosure is to provide a radiation image photographing apparatus which can be flexed recoverably in accordance with the purpose of use.

To solve the above problems, a radiation image photographing apparatus according to some embodiments can include:

a radiation detector having flexibility;

a support base configured to support the radiation detector;

a case housing the radiation detector;

an internal component configured to drive the radiation detector; and a holding unit, wherein the holding unit is formed by a member capable of absorbing a deviation in relative position caused by a difference between a bending rigidity of the internal component and a bending rigidity of a configuration when a deflection occurs in the configuration including the radiation detector, the support base, and the case.

Further features of the present disclosure will become apparent from the following description of exemplary embodiments with reference to the attached drawings.

DESCRIPTION OF THE EMBODIMENTS

Figure 1:
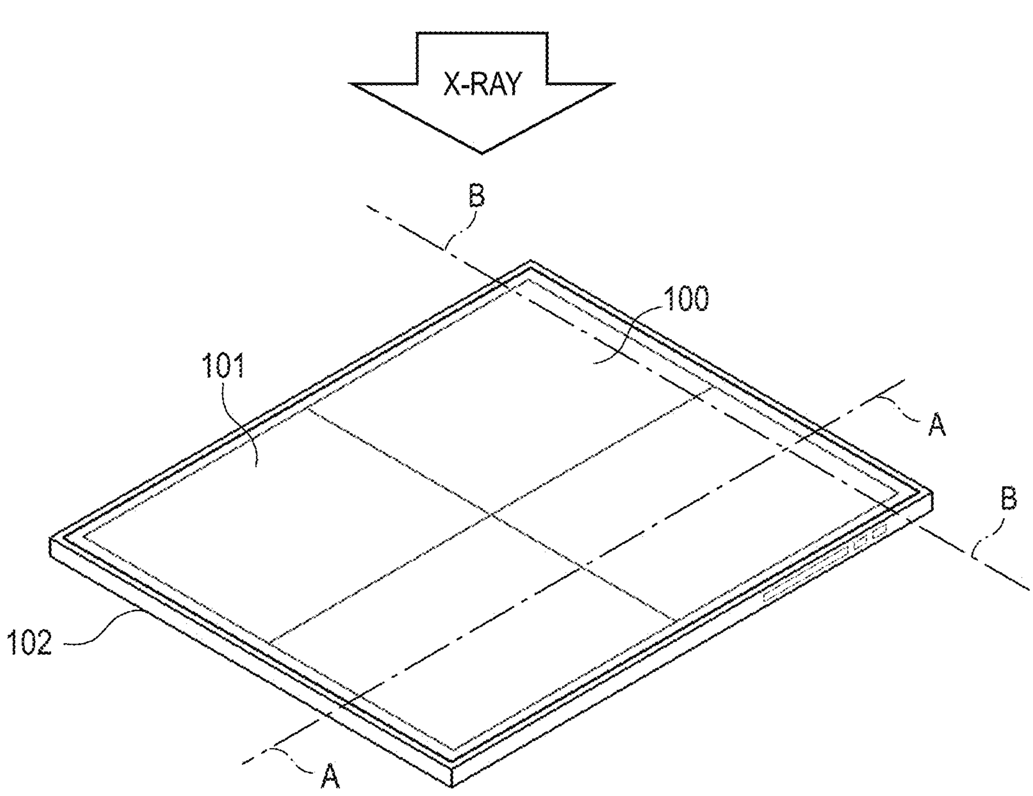
FIG. 1 is an external view of a radiation image photographing apparatus according to some embodiments.

Various exemplary embodiments, features, and aspect to embody the present disclosure will be described in detail below with reference to the drawings. However, dimensions, materials, shapes, and relative positions of the components shown in each of the following embodiments are optional and may be modified according to the configuration or various conditions of the apparatus to which the present disclosure applies, without limiting the matters shown in the text and figures. In addition, although the plural features are described in the embodiments, not all of these plural features may be essential to the disclosure, and the plural features may be optionally combined. In addition, in the accompanying drawings, the same reference numerals are used between drawings to indicate elements that are identical or functionally similar.

In the radiation image photographing apparatus, even if a case or exterior thereof is capable of being bent, for example, by external force or load, an electrical substrate, for example, which is also incapable of being bent similarly and which may be damaged if further bending is retained thereon. In the following description, an object of the radiation image photographing apparatus is to provide flexibility as a whole of the apparatus, in which internal components such as the electrical substrate, which are less flexible with respect to the member used for housing, and which may be damaged if further bent.

In the present specification, flexibility refers to a characteristic that when a load that promotes a specific deformation is applied, the radiation image photographing apparatus recoverably flexes in response to the applied load. High flexibility means that the radiation image photographing apparatus recoverably flexes in response to the applied load and that the amount of deflection is large. Low flexibility means that the radiation image photographing apparatus recoverably flexes in response to the applied load, but the amount of deflection is small, and the possibility of causing plastic deformation such as failure when subjected to a larger load is higher than that of the radiation image photographing apparatus with high flexibility. Bending rigidity refers to the property that a member flexes when a load is applied to the member. A large bending rigidity means a large load required to bend the member, and a small bending rigidity means a small load required to bend the member.

The radiation image photographing apparatus according to the present disclosure is applied to, for example, a medical image diagnostic apparatus, a nondestructive inspection apparatus, an analysis apparatus using radiation, and the like. Although X-rays are exemplified as radiation in this specification, α-rays, β-rays, γ-rays, particle rays, cosmic rays, and the like are also included in radiation.

First Embodiment

Figure 2:
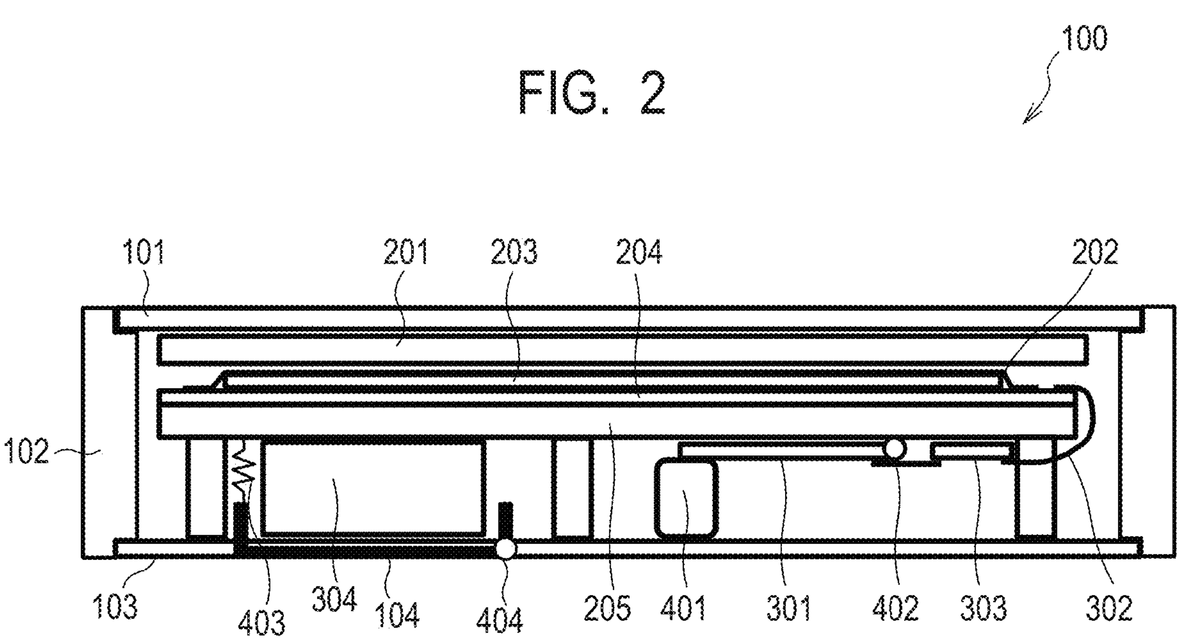
FIG. 2 is a partial cross-sectional view of the radiation image photographing apparatus according to a first embodiment.

Referring to FIGS. 1 to 4, a radiation image photographing apparatus according to the first embodiment of the present disclosure will be described below. FIG. 1 is a perspective view of the radiation image photographing apparatus 100 according to the first embodiment of the present disclosure, viewed from the direction of incidence of X-rays. FIG. 2 is a cross-sectional view of the apparatus at the position of line A-A in FIG. 1. For ease of explanation, in FIG. 1, it is assumed that a direction of incidence of X-rays is in the Z-axis direction and a direction perpendicular to the Z-axis, and extending on line A-A in the extending plane of the flat-plate radiation image photographing apparatus 100 is in the X-axis direction, and a direction perpendicular to the Z-axis direction and the X-axis direction is in the Y-axis direction.

As shown in FIG. 2, the radiation image photographing apparatus 100 according to the present embodiment is provided with an upper cover 101, a frame 102, and a lower cover 103 as its case. Each of the configurations to be described later is housed inside the case made of these.

In this embodiment, the lower cover 103 is partially provided with an opening for housing a battery to be described later. The opening is provided with a cover 104 for the battery, and the inside of the case is a closed space.

The inside of the case accommodates a buffer 201, a phosphor protection layer 202, a phosphor 203, a radiation detector 204, and a support base 205. A semiconductor sensor is mounted on the radiation detector 204. A phosphor protection layer 202 is disposed on the X-ray incidence surface side of the phosphor 203. A member such as an aluminum material that does not allow humidity to pass through is used for the phosphor protection layer 202. A buffer 201 is disposed between the phosphor protection layer 202 and the upper cover 101. The buffer 201 serves to protect the radiation detector 204 from a load caused by, for example, an external impact.

The support base 205 supports the radiation detector 204. However, a member having a function of shielding incoming X-rays may be disposed between the radiation detector 204 and the support base 205. Heavy metals such as lead and tungsten are often used as the shielding member. By arranging such a shielding member, it is possible to reduce artifacts in the acquired image and to protect the first electric substrate 301, which will be described later, from X-rays.

Until now, a support base made of glass has been adopted for the radiation detector 204. Since such a support base of glass with a risk of breakage is arranged inside the case of the radiation detector, it was necessary to protect it. For this reason, a material with high X-ray transmittance such as CFRP (carbon fiber reinforced plastic) was often used for the upper cover 101. In addition, a light and strong material such as aluminum alloy, magnesium alloy, or CFRP was often used for the frame 102 and the lower cover 103.

However, in recent years, resin film has been adopted instead of glass as a support base. Therefore, the level of protection required for the case has changed from the conventional one. In addition, radiation detection apparatus having a flexible function unique to resin film has been developed, and materials corresponding to the function have been adopted for the case.

A first electric substrate 301, a flexible substrate 302, a second electric substrate 303, and a battery 304 are also housed inside the case. The phosphor 203 converts radiation incident in the apparatus into light, and the light from the phosphor 203 is converted into an electric signal by the radiation detector 204. The converted electric signal is sent to the first electric substrate 301 through the flexible substrate 302. The first electric substrate 301 can, for example, use the electric signal to generate a radiation image. The second electric substrate 303 is connected to the first electric substrate 301 by flexible wiring (not shown). Here, as the radiation image photographing apparatus 100, an indirect conversion type is exemplified in which radiation is converted to visible light by using the phosphor 203 and visible light is converted to an electric signal by the radiation detector 204. However, the object of the present disclosure is not limited to the radiation image photographing apparatus having an indirect conversion type sensor, and may be a direct conversion type sensor which directly converts incident radiation to an electric signal.

In this embodiment, the first electric substrate 301 is held by the first fixing member 401 and the second fixing member 402 inside the radiation image photographing apparatus 100, or more specifically, the case. The material of the first electric substrate 301 is, for example, glass epoxy resin, and has a multi-layer circuit structure. In addition, the substrate itself is configured to have high rigidity in order to secure the mounted electric components. The first electric substrate 301 having such a configuration is less flexible than the case or the support base 205 made of resin, for example, and may break without bending in accordance with the case or the like against excessive external force.

Figure 3:
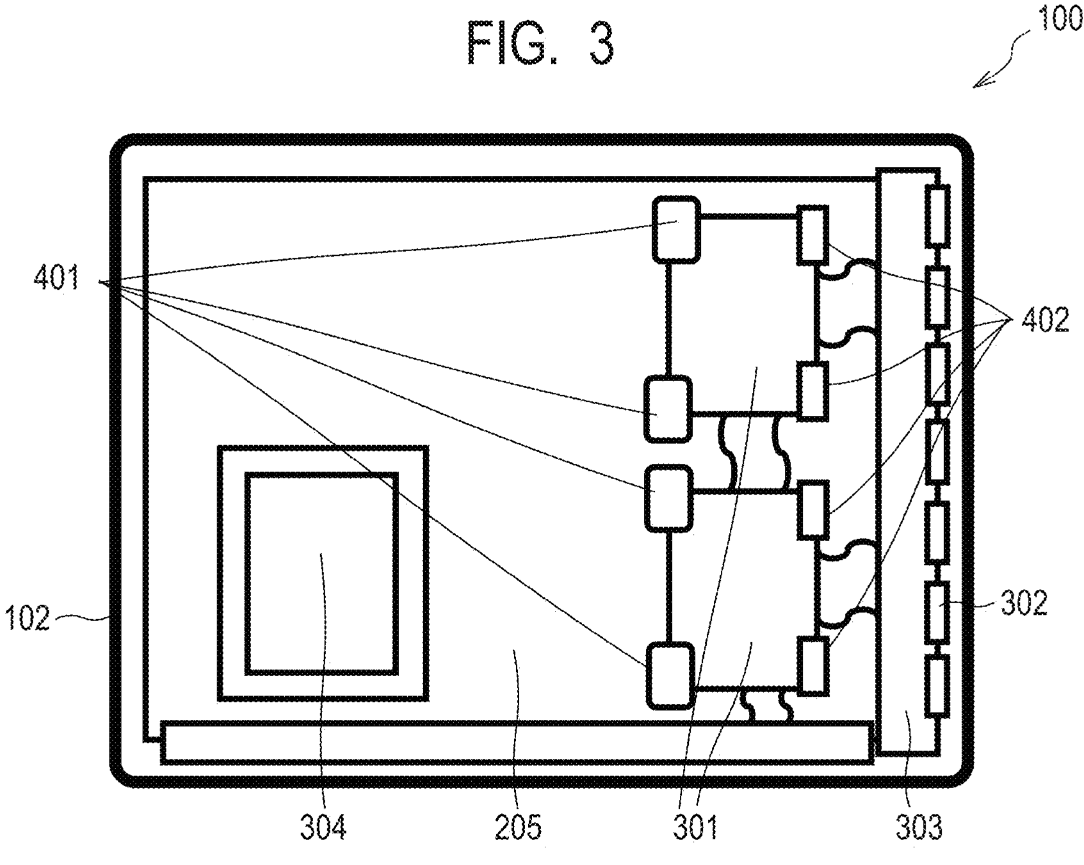
FIG. 3 is a rear view of the radiation image photographing apparatus according to the first embodiment.

The positional relationship between the electric substrate and the fixing member will now be described with reference to FIG. 3. FIG. 3 is a view of the radiation image photographing apparatus 100 viewed from the lower cover 103 side in FIG. 2. In FIG. 3, the lower cover 103 is removed so that the internal structure can be seen. As shown in FIG. 3, the first electric substrate 301 is supported by the first fixing member 401 and the second fixing member 402 at both ends in the X-axis direction, for example.

The first fixing member 401 is made of a material having an elastic force and is arranged between the lower cover 103 and the first electric substrate 301. The first fixing member 401 is fixed to either or both of the first electric substrate 301 and the lower cover 103. The second fixing member 402 has a hinge mechanism, one of which is fixed to the support base 205 and the other is fixed to the first electric substrate 301. Thereby, the first electric substrate 301 is rotatably supported with the second fixing member 402 as a rotation center.

The support mode of the second electric substrate 303 with the support base 205 will be described later as a third embodiment.

Figure 4:
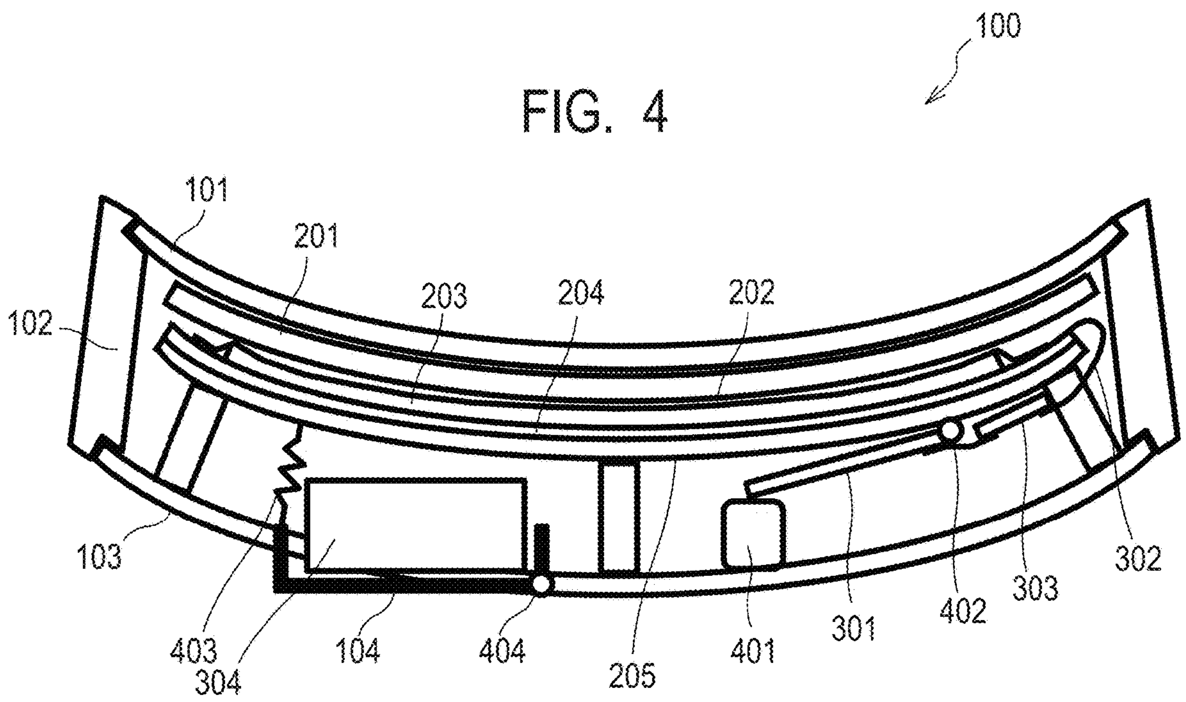
FIG. 4 is a partial cross-sectional view of the radiation image photographing apparatus according to the first embodiment.

Next, the effects of providing the first fixing member 401 and the second fixing member 402 as described above will be described with reference to FIG. 4. FIG. 4 shows, in the same manner as FIG. 2, a state in which the radiation image photographing apparatus 100 is bent (curved) such that both ends in the X-axis direction are positioned on the upper side in the Z-axis direction and the center part in the X-axis direction is positioned on the lower side in the Z-axis direction.

As shown in FIG. 4, when the radiation image photographing apparatus 100 is curved, the first electric substrate 301 moves so as to rotate from the hinge of the second fixing member 402. In accordance with the bending of the radiation image photographing apparatus 100, the first fixing member 401 is deformed by compression due to its elasticity. Thus, the first fixing member 401 can hold the first electric substrate 301 in a predetermined position while reducing the load applied to the first electric substrate 301 to induce the bending deformation. When the curvature of the radiation image photographing apparatus 100 returns to the original state, the first electric substrate 301 also returns to the original position by the elastic force of the first fixing member 401.

In the embodiment shown in FIG. 3, the first fixing member 401 and the second fixing member 402 are arranged at the corners of the first electric substrate 301, but these arrangements need not necessarily be at the corners of the electric substrate. An appropriate arrangement may be made according to the shape of the substrate and the bending direction of the radiation image photographing apparatus 100 assumed. For example, in the radiation image photographing apparatus 100, and more particularly in the radiation detector 204, if the bending direction assumed is along the Z-axis direction, the fixing members may be arranged at two different locations in an arbitrary direction (e.g., the X-axis direction) in the XY plane orthogonal to the Z-axis direction.

Here, a hinge mechanism is used as the second fixing member 402 for rotatably supporting the first electric substrate 301. However, the mode of the second fixing member 402 is not limited to the hinge mechanism, and a ball joint may be employed in the joint portion. For example, a ball joint mechanism may be employed in only one corner portion of the rectangular first electric substrate 301, and an elastic member similar to the first fixing member 401 may be arranged in other portions (corners).

In this embodiment, the first fixing member 401 is made of an elastic member, and specifically, for example, is made of a porous foam material, rubber and the like. By constructing such a material, even if a pressing or pulling load is applied to the position where the radiation image photographing apparatus 100 is bent and the fixing member 401 comes into contact with the first electric substrate 301, the first fixing member 401 deforms and the load applied to the first electric substrate 301 can be reduced.

In addition, the elastic force of the first fixing member 401 need not be uniform throughout the member and may be partially changed. For example, the portion that holds the first electric substrate 301 may have a slightly higher elastic force to ensure the holding of the substrate, and the other portion may have a lower elastic force to deform significantly when the radiation image photographing apparatus is bent. Furthermore, the first fixing member 401 may be composed of a plurality of members made of different materials. For example, a structure in which the vicinity directly touching the first electric substrate 301 is composed of a resin material, and other parts are composed of an elastic body such as a spring or a foam material can be exemplified. In addition, from the viewpoint of protecting the first electric substrate 301, a member for relieving insulation and impact may be arranged between the support base 205 and the first electric substrate 301.

As described above, the radiation image photographing apparatus 100 according to this embodiment includes a radiation detector 204, a support base 205, a case (101,102, 103), an internal component (first electric substrate 301), and a holding unit (fixing member 401,402). In this embodiment, the radiation detector 204 has flexibility. The support base 205 supports the radiation detector 204. The case including the upper cover 101, the frame 102, and the lower cover 103 includes the radiation detector 204. Internal components, as exemplified by the first electric substrate 301 and the second electric substrate 303, are used to drive the radiation detector 204.

As described above, the bending rigidity of the configuration including the radiation detector 204, the support base 205, and the case is different from the bending rigidity of the internal components. Therefore, when bending occurs in the configuration as illustrated in FIG. 4, due to the difference from the bending rigidity, for example, the contact position of the first electric substrate 301 with the first fixing member 401 is shifted relative to the support base 205. The first fixing member 401 is composed of, for example, the elastic member described above, which can absorb a relative deviation such as a shift in relative position. More specifically, in the radiation image photographing apparatus 100, an internal component (the first electric substrate 301) that does not bend relatively is arranged inside the above-described structure, which bends substantially in the difference of bending rigidity. When the above-described structure bends, the internal component does not bend as much as, for example, the support base 205, so that the end portion of the internal component fixed to, for example, the support base 205 has a small position deviation relative to the radiation detector 204. Further, the end portion of the internal component not fixed to the support base 205 changes its relative position so as to be away from the radiation detector 204, so that the end portion has a large relative position deviation. The first fixing member 401 absorbs the change (deviation) of the relative position, so that the internal components can be stably held in the bent radiation image photographing apparatus 100. The first fixing member 401 also reduces the difference in the load applied from at least one of the configurations including the radiation detector 204, the support base 205, and the exterior to the portions where the relative position deviation is large and small.

In addition, when the above-described structure is reversibly bent as illustrated in FIG. 4 due to an applied load or the like, the internal component (first electric substrate 301) is loaded from the first fixing member 401 at its abutting portion due to the difference in bending rigidity described above. In this embodiment, by constituting the first fixing member 401 with a member having an elastic force, the first fixing member 401 is provided with a function of reducing the load applied to the internal component. Although the first electric substrate 301 is held by the case (lower cover 103) via the first fixing member 401, it may be held by a highly flexible member such as a radiation detector 204 or a support base 205 via the first fixing member 401.

In this embodiment, it is mentioned in a case where the bending rigidity of the configuration including the radiation detector 204, the support base 205, and the case is smaller than the bending rigidity of the internal component. However, the present disclosure is applicable even in the case where the bending rigidity of the electrical component is smaller than the bending rigidity of the case. By arranging the holding unit of the present disclosure, it is possible to reduce the possibility of damage of various components in the radiation image photographing apparatus due to differences in bending rigidity.

The holding unit may include a first member (first fixing member 401) and a second member (second fixing member 402). As shown in FIG. 2, the first fixing member 401 is disposed in contact with the first electric substrate 301. In addition, the second fixing member 402 can be disposed at a position different from a position of the first fixing member 401, for example, in the X-axis direction or Y-axis direction, which is orthogonal to the Z-axis direction, which is the bending direction when the configuration including the radiation detector 204 is bent. Further, the first fixing member 401 may be composed of an elastic member which can be deformed in response to a pressing (or pulling) when the first electric substrate is pressed (or pulled) at a position where it comes into contact with the first electric substrate 301 due to a load applied to bending. More specifically, the first fixing member 401 may comprise a porous foam, springs, rubber, members having different elastic moduli, or a combination thereof. In addition, the first fixing member 401 may be fixed to an inner surface corresponding to the first electric substrate 301 of the case (lower cover 103).

In addition, in this embodiment, the second fixing member 402 rotatably supports the internal components so that the first electric substrate 301 can respond to pressure (or pull) force when the first electric substrate 301 is pressed (or pulled) at a position where it is in contact with the first fixing member 401 by a load that causes the bending. More specifically, the second fixing member 402 may comprise a hinge mechanism, a ball joint, a porous foam material, a spring material, or desired combinations thereof. In this embodiment, the first electric substrate 301 is exemplified as an internal component as an object to be supported by the fixing member. However, the internal component may include an electric circuit board or a battery. The electric circuit board may include an electric circuit board for driving the radiation detector 204, an electric circuit board for reading signals detected by the radiation detector 204, and the like.

By arranging the first fixing member 401 and the second fixing member 402 described above, it is possible to provide a radiation image photographing apparatus capable of bending to a desired shape while reducing the load on an internal structure such as an electric substrate. That is, in the radiation image photographing apparatus in which an internal component such as an electric substrate having low flexibility is held inside by a case and a base having high flexibility, the radiation image photographing apparatus can be bent without considering the flexibility of the internal component by using the aforementioned fixing member. In addition, the desired flexibility can be realized without affecting the flexibility of the radiation image photographing apparatus as a whole without subdividing the electric substrate or the like.

Second Embodiment

Figure 5:
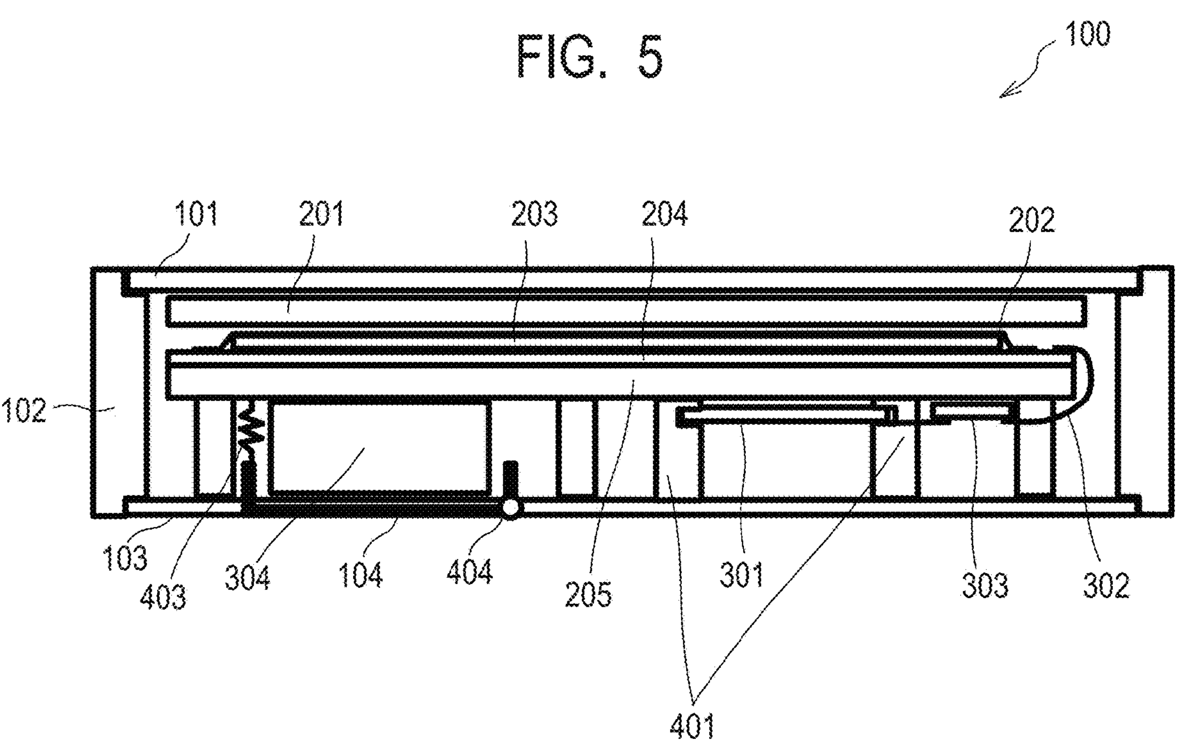
FIG. 5 is a partial cross-sectional view of the radiation image photographing apparatus according to a second embodiment.

Next, a radiation image photographing apparatus according to the second embodiment of the present disclosure will be described with reference to FIGS. 5 to 7. FIG. 5 is a view showing a configuration according to the second embodiment, and a view showing a cross section of the apparatus at the position of line A-A of the radiation image photographing apparatus having the appearance shown in FIG. 1 in the same manner as FIG. 2.

In contrast to the radiation image photographing apparatus 100 described in the first embodiment, in the radiation image photographing apparatus 500 according to this embodiment, the first electric substrate 301 is held inside the case only by the first fixing member 401 described above. The first fixing member 401 is fixed to the lower cover 103. FIG. 6 is a view of the radiation image photographing apparatus 500 viewed from the lower cover 103 side in FIG. 5. In FIG. 6, the lower cover 103 is removed so that the internal structure can be seen. As shown in FIG. 6, the first electric substrate 301 is supported by, for example, a plurality of first fixing members 401 arranged to correspond to the rectangular corners of the first electric substrate 301.

In the first embodiment, the movement of the first electric substrate 301 in the front-rear direction (X-axis direction) and the left-right direction (Y-axis direction) in FIG. 5 is regulated by the second fixing member 402. In contrast, in the second embodiment, instead of the second fixing member 402, the first fixing member 401 arranged at the four corners has the function. In other words, in this embodiment, the first fixing member 401 holds the first electric substrate 301 in the vertical direction (Z-axis direction) shown in FIG. 5 and regulates the movement in the vertical direction (XY-axis direction) shown in FIG. 5.

Figure 7:
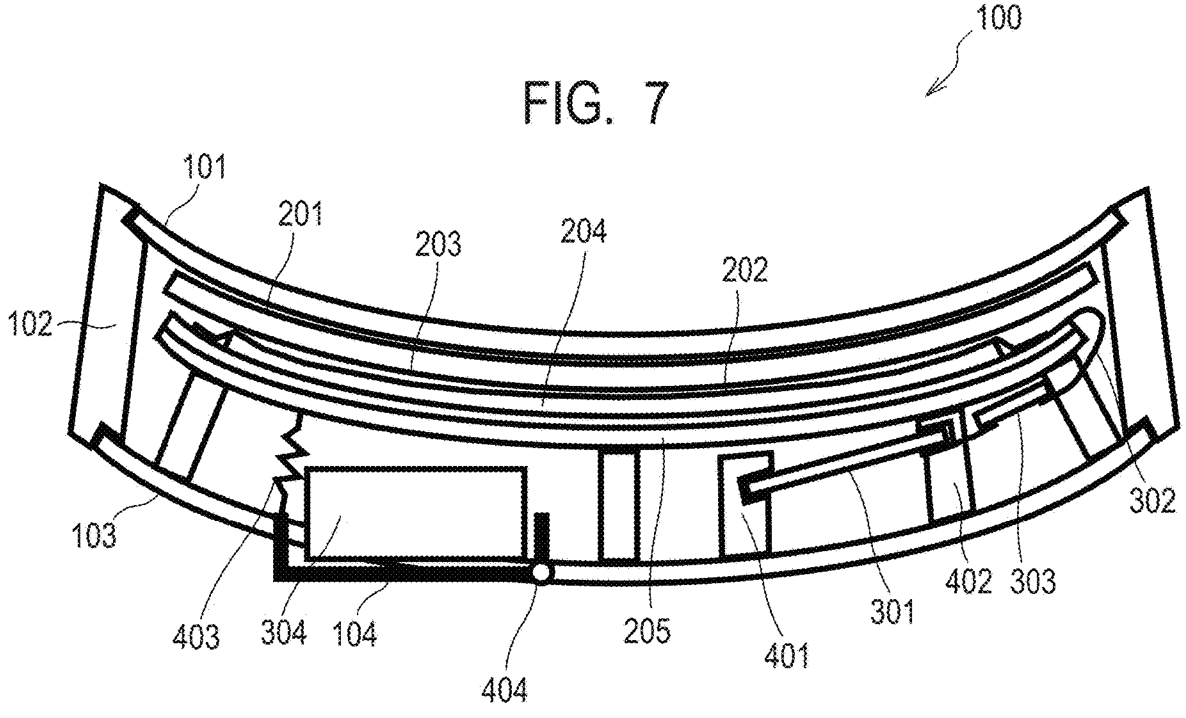
FIG. 7 is a partial cross-sectional view of the radiation image photographing apparatus according to the second embodiment.

FIG. 7 shows a state in which the radiation image photographing apparatus 500 is bent (curved) so that both ends in the X-axis direction are located on the upper side in the Z-axis direction and the central part in the X-axis direction is located on the lower side in the Z-axis direction, similar to the example shown in FIG. 4. As shown in FIG. 7, when the radiation image photographing apparatus 500 is bent, the first fixing member 401 is compressed and deformed by the elastic force in response to the bending of the radiation image photographing apparatus 500. As a result, the first fixing member 401 can maintain a state in which a load for inducing excessive bending deformation is not applied to the first electric substrate 301. When the bending of the radiation image photographing apparatus 500 returns to the original state, the first electric substrate 301 also returns to the original position by the elastic force of the first fixing member 401.

Figure 6:
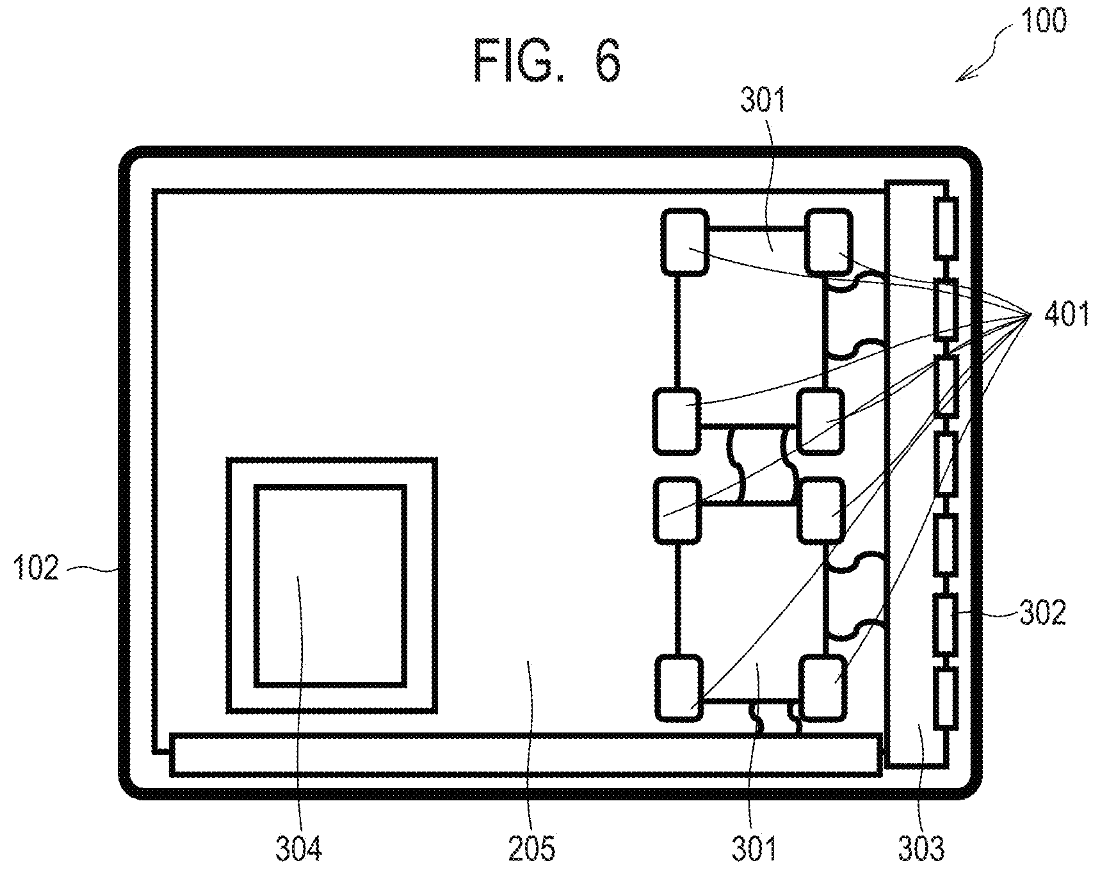
FIG. 6 is a rear view of the radiation image photographing apparatus according to the second embodiment.

In the example shown in FIG. 6, the first fixing member 401 is arranged at the corner of the first electric substrate 301, but as in the first embodiment, these arrangements need not necessarily be at the corner of the electric substrate. An appropriate arrangement may be made in accordance with the shape of the substrate and the assumed bending state of the radiation image photographing apparatus 500. The material and configuration of the first fixing member 401 may also be the same as in first embodiment. That is, the second fixing member 402 in first embodiment may comprise a hinge mechanism, a ball joint, a spring material, a porous foam material, and a combination of members having different elastic moduli, similar to the first fixing member 401.

As described above, in this embodiment, the second fixing member 402 used in the first embodiment is replaced with the first fixing member 401. Even in this aspect, the same effect as in the first embodiment can be obtained by arranging the first fixing member having elasticity at the same position as the arrangement of the second fixing member 402. That is, in this embodiment, the second fixing member can be composed of the same material as the first fixing member 401. The second fixing member in this embodiment rotatably supports the internal component so that the first electric substrate 301 can respond to pressing (or pulling) when the first electric substrate 301 is pressed (or pulled) at a position at which the internal component is in contact with the first fixing member 401 (arrangement in FIG. 2), by a load that causes the bending.

By arranging the first fixing member 401 described above, it is possible to provide a radiation image photographing apparatus that can bend into a desired shape while reducing the load applied to the internal structure. That is, in the radiation image photographing apparatus that holds the internal components having a low flexibility inside by the case and base having the high flexibility, the radiation image photographing apparatus can be bent without considering the flexibility of the internal components by using the aforementioned fixing member.

Third Embodiment

The first and second embodiments described above have exemplified aspects of the radiation image photographing apparatus which accommodates an internal structure such as an electrical substrate having a substantially rectangular shape and four corners of which can be supported by an elastic member, and which can be bent to a desired shape. However, the electrical substrate includes a rectangular shape but a long strip shape in one direction, such as the second electric substrate 303. In such a shape, when the fixing members are arranged at the four corners as in the first and second embodiments, there is a risk of a problem of securing space for the fixing members. In addition, the area where the fixing members support the electric substrate becomes relatively small with respect to the area of the electric substrate, and there is a possibility that sufficient support cannot be provided when the radiation image photographing apparatus is bent. The present Embodiment aims at coping with such a long electric substrate.

Figure 8:
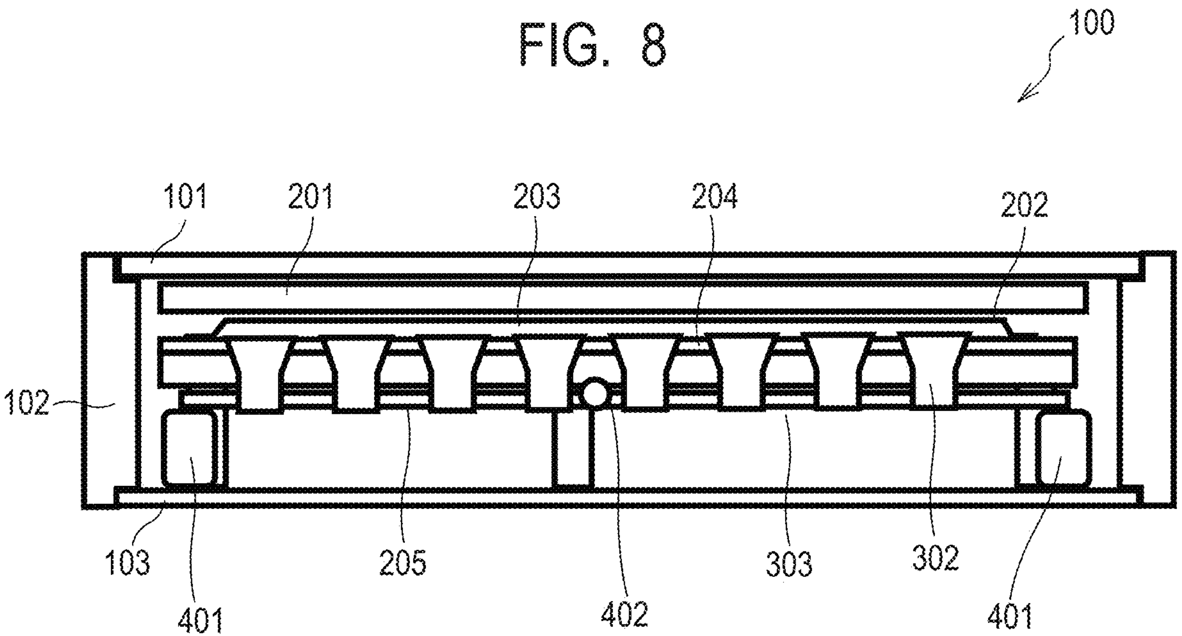
FIG. 8 is a partial cross-sectional view of the radiation image photographing apparatus according to a third embodiment.

In the present embodiment, a mode of supporting a long second electric substrate 303 extending in the Y-axis direction in the radiation image photographing apparatus 100 illustrated in first embodiment will be described. FIG. 8 is a diagram showing a configuration of the radiation image photographing apparatus 100 in the third embodiment, and the diagram showing a cross section of the apparatus at the position of line B-B in FIG. 1.

As shown in FIG. 8, the second electric substrate 303 is connected to the radiation detector 204 at a plurality of positions through a plurality of flexible substrates 302. The second electric substrate 303 is fixed to one of the ball joints of the second fixing member 402 disposed near the center in the Y-axis direction (longitudinal direction), and the other of the ball joints of the second fixing member 402 is fixed to the support base 205. The second electric substrate 303 is supported by the first fixing member 401 disposed at both ends in the Y-axis direction (longitudinal direction). The first fixing member is fixed to either or both of the second electric substrate 303 and the lower cover 103.

Figure 9:
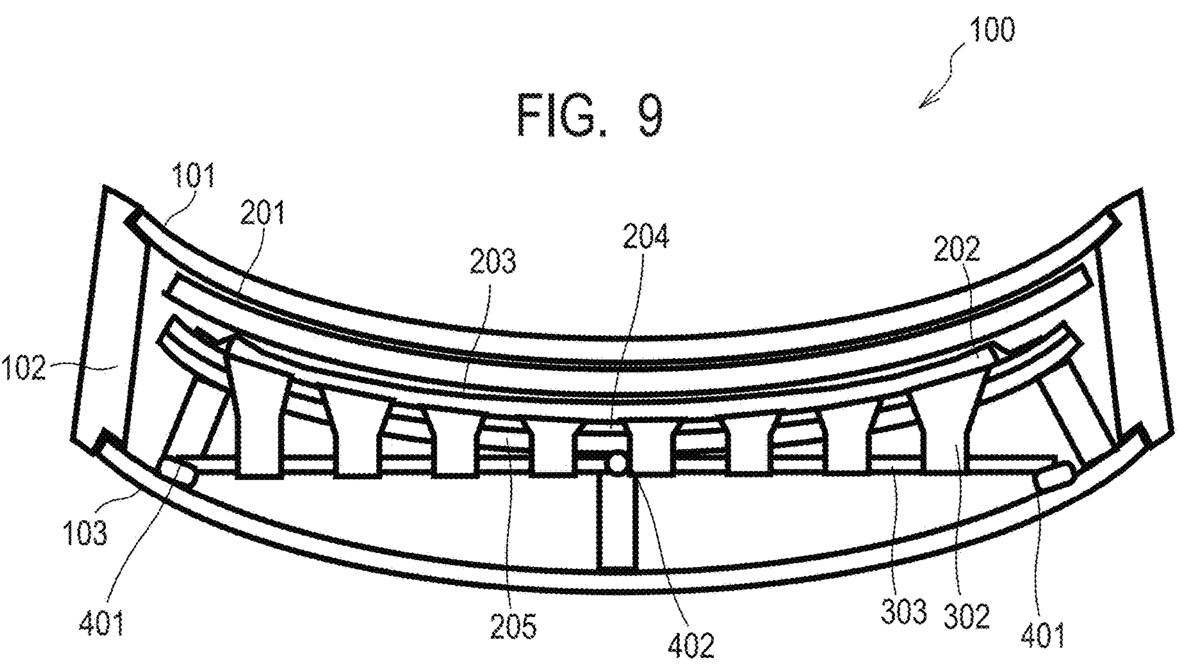
FIG. 9 is a partial cross-sectional view of the radiation image photographing apparatus according to the third embodiment.

Next, the effects of the first fixing member 401 and the second fixing member 402 as described above will be described with reference to FIG. 9. FIG. 9 shows, in the same manner as FIG. 2, a state in which the radiation image photographing apparatus 100 is bent (curved) so that, for example, both ends in the Y-axis direction are located on the upper side in the Z-axis direction and the center part in the Y-axis direction is located on the lower side in the Z-axis direction.

As shown in FIG. 9, when the radiation image photographing apparatus 100 is bent, the second electric substrate 303 moves in the same manner as in first embodiment so as to rotate from the joint part of the second fixing member 402. Each of the first fixing members 401 at both ends is compressed and deformed by the elastic force according to the bending of the radiation image photographing apparatus 100. As a result, the first fixing member 401 can hold the first electric substrate 301 in a predetermined position while reducing the load applied to the first electric substrate 301 to induce bending deformation. When the bending of the radiation image photographing apparatus 100 returns to the original state, the first electric substrate 301 also returns to the original position by the elastic force of the first fixing member 401.

However, in this embodiment, the long substrate pf which length is close to the total length of the radiation image photographing apparatus 100, and a plurality of flexible substrates 302 are attached to the second electric substrate. In such a case, when the whole apparatus is bent, the flexible substrate 302 may limit the bending deformation. FIG. 9 shows a bending state of the radiation image photographing apparatus 100, and the flexible substrate 302 is shown to be elongated in the figure. However, although the base material of the actual flexible substrate 302 can be said to be a resin film, it hardly extends. Therefore, in this embodiment, the flexible substrate 302 is arranged as shown in FIG. 10 or 11.

Figure 10:
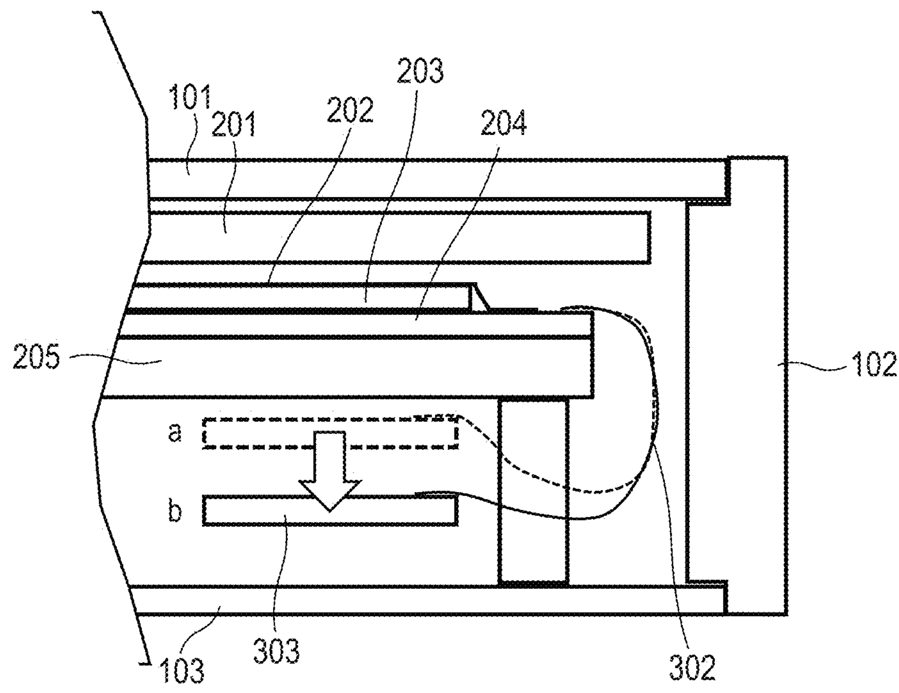
FIGS. 10 and 11 are partial enlarged views of the cross-section shown in FIG. 9.

FIG. 10 is an enlarged view around the left end portion of FIG. 2, showing the movement of the second electric substrate 303 due to the bending of the radiation image photographing apparatus 100 and the corresponding deformation of the flexible substrate 302. In FIG. 10, the flexible substrate 302 is disposed so as to electrically connect the radiation detector 204 and the second electric substrate 303. At this time, the length of the flexible substrate 302 is not made to be the shortest length that can be connected, but is made to be the length that is assumed when the radiation image photographing apparatus 100 is bent.

Thus, even when the gap between the second electric substrate 303 and the support base 205 becomes large at the end portion of the second electric substrate 303 when the radiation image photographing apparatus 100 is bent, the second electric substrate 303 can be maintained in a state in which no bending load is applied. Specifically, in FIG. 10, before and after bending, the second electric substrate 303 moves from the position a (the normal position) to the position b (the bending deformation position). Even in such a case, the flexible substrate 302 only changes the way of bending, and no load such as pulling is caused to the second electric substrate 303. Therefore, it is possible to maintain a state in which no bending load is applied to the second electric substrate 303 regardless of whether or not the radiation image photographing apparatus 100 is bent.

Figure 11:
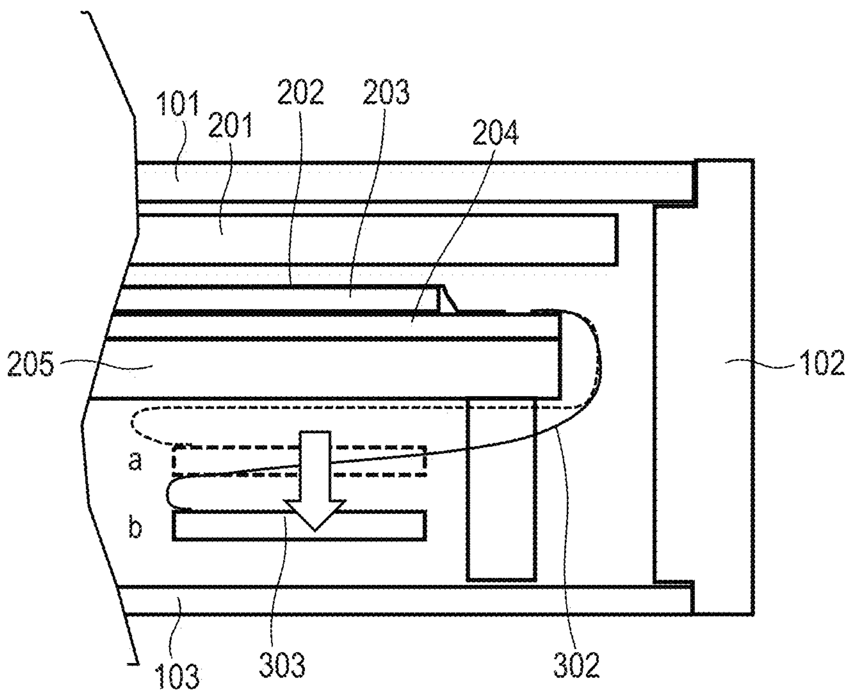

FIG. 11 shows a further mode of the flexible substrate 302 in the same manner as FIG. 10. In the example shown in FIG. 11, the connection position between the flexible substrate 302 and the second electric substrate 303 is set at a different position from that shown in FIG. 10, and the flexible substrate 302 is arranged in such a manner that it is folded. In such a configuration, when the radiation image photographing apparatus 100 is bent, the folded flexible substrate 302 is opened when the gap between the support base 205 and the end portion of the second electric substrate 303 becomes large. Thus, the flexible substrate 302 can follow the relative position change of the second electric substrate 303.

In the third embodiment, the configuration described in the first embodiment has been described. However, the application example of the present disclosure is not limited to the embodiment using both the first fixing member 401 and the second fixing member 402. For example, as illustrated in the second embodiment, only the first fixing member 401 having an elastic force may be used.

By arranging the first fixing member 401 and the second fixing member 402 described above, it is possible to provide a radiation image photographing apparatus capable of bending to a desired shape while reducing the load on the internal structure. That is, in the radiation image photographing apparatus in which the internal components having low flexibility are held inside by the case and the support base having higher flexibility, the radiation image photographing apparatus can be bent without considering the flexibility of the internal components by using the aforementioned fixing member.

Fourth Embodiment

In the above-described first and second embodiments, a configuration corresponding to an internal component having a shape exemplified by the first electric substrate 301 is described. In the third embodiment, a configuration corresponding to an internal component having a shape exemplified by the second electric substrate 303 is described. In the fourth embodiment, a mode in which an internal component exemplified by the battery 304, which has a thickness, is disposed almost without clearance in the radiation image photographing apparatus, and the radiation image photographing apparatus can be bent to a desired shape, is described.

Hereinafter, a configuration for holding the battery 304 will be described with reference to FIGS. 1 and 2 referred to in the first embodiment. In FIG. 2, a battery 304 and a battery cover 104 are disposed on the rear side of the radiation image photographing apparatus 100. The battery cover 104 is held by the radiation image photographing apparatus 100 through a fourth fixing member 404 having a hinge mechanism and a third fixing member 403 having an elastic function. The third fixing member 403 is made of an elastic member such as a spring or rubber, and is fixed to one end of the battery cover 104. When the battery cover 104 is rotated around the fourth fixing member 404 fixed to the other end, the third fixing member 403 regulates the movement of one end of the battery cover 104 to define the limit of rotation.

The battery 304 is thicker than the first electric substrate 301 and the second electric substrate 303, and is disposed within the radiation image photographing apparatus 100 with almost no clearance. When the radiation image photographing apparatus 100 is bent in such a state, as shown in FIG. 4, the third fixing member 403 made of an elastic member extends around the fourth fixing member 404 as an axis in response to the overall bending, and partially protrudes from the outer shape of the radiation image photographing apparatus 100.

Here, a metal material such as aluminum or a relatively rigid material such as CFRP is used for the battery cover 104. In this embodiment, the battery cover 104 is partially protruded to the outside of the radiation image photographing apparatus 100 when there is no space within the apparatus to reduce the stress applied to the internal components. With this configuration, the radiation image photographing apparatus 100 can bend to a desired shape without applying excessive load to the battery 304.

In the above example, the description is made on the premise that the battery 304 is incorporated in the radiation image photographing apparatus 100. However, the battery 304 may be detachable. When detachable, the battery cover 104 may have the structure described above, and the battery cover 104 may be opened/closed or detachable. Alternatively, instead of arranging the battery cover 104, a portion of the lower cover 103 may be formed of a stretchable material. That is, a portion of the case (lower cover 103 in the illustrated example) to which the battery 304 contacts when the configuration of the radiation detector 204 or the like is bent may be formed of an elastic member.

By arranging the third fixing member 403 and the fourth fixing member 404 described above, it is possible to provide a radiation image photographing apparatus that can bend into a desired shape while reducing the load on the internal structure. That is, in the radiation image photographing apparatus that holds the internal components having low flexibility in its inside by the case and the support base, the radiation image photographing apparatus can bend without considering the flexibility of the internal components by using the aforementioned fixing member.

According to the present disclosure including the above embodiments, it is possible to provide a radiation image photographing apparatus that recoverably bends according to the intended use. In addition, since it is not necessary to subdivide an electric substrate into a plurality of small substrates, it is possible to reduce the possibility of a time delay in the exchange of electric signals between the substrates.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-081392, filed May 17, 2023, which is hereby incorporated by reference herein in its entirety.

What is claimed is:

1. A radiation image photographing apparatus comprising:

a radiation detector that is bent recoverable under an applied load;

a support base configured to support the radiation detector and recoverably bend in accordance with the radiation detector;

a case housing the radiation detector and recoverably bending in accordance with the radiation detector;

an internal component configured to drive the radiation detector; and a holding unit configured to hold the internal component, wherein the holding unit has a function of reducing a load applied from at least one of configurations including the radiation detector, the support base, and the case, by causing a small deviation of a position relative to the radiation detector in the internal component and a large deviation of a position relative to the radiation detector in the internal component when the radiation detector is bent, and wherein the holding unit comprises a first member disposed in contact with the internal component, and a second member disposed at a position different from a position of the first member in a direction orthogonal to a bending direction in which the configurations are recoverably bent.

2. The radiation image photographing apparatus according to claim 1, wherein the first member is an elastic member that deforms in response to a pressing or a pulling when a position of the internal component at which the internal component is in contact with the first member is pressed or pulled by the applied load.

3. The radiation image photographing apparatus according to claim 1, wherein the first member is a member formed from a porous foam material, a spring, a rubber, or a composition of materials having different elastic moduli.

4. The radiation image photographing apparatus according to claim 2, wherein the second member is an elastic member that deforms in response to a pressing or pulling when a position of the internal component at which the internal component is in contact with the first member is pressed or pulled by the applied load.

5. The radiation image photographing apparatus according to claim 2, wherein the second member is a member that rotatably supports the internal component when a position of the internal component at which the internal component is in contact with the first member is pressed or pulled by the applied load.

6. The radiation image photographing apparatus according to claim 3, wherein the second member comprises a hinge mechanism, a ball joint, a porous foam material, or a spring material.

7. The radiation image photographing apparatus according to claim 1, wherein the first member is fixed to a side of the support base or to an inner surface of the case, corresponding to the internal component.

8. The radiation image photographing apparatus according to claim 1, wherein a part of the case with which the internal component comes into contact, when the configurations are bent is composed of an elastic member.

9. The radiation image photographing apparatus according to claim 1, wherein the internal component comprises at least one of an electrical circuit board for driving the radiation detector, an electrical circuit board for reading signals detected by the radiation detector, and a battery.

* * * * *